(12) United States Patent
Larsen et al.

(10) Patent No.: US 7,979,294 B2
(45) Date of Patent: Jul. 12, 2011

(54) SYSTEM AND METHOD FOR PROVIDING DECISION SUPPORT TO APPOINTMENT SCHEDULERS IN A HEALTHCARE SETTING

(75) Inventors: Steven J. Larsen, Cross Plains, WI (US); Sameer Grover, Sun Prairie, WI (US); Marie C. Derose, Madison, WI (US)

(73) Assignee: Epic Systems Corporation, Verona, WI (US)

( * ) Notice: Subject to any disclaimer, the term of this patent is extended or adjusted under 35 U.S.C. 154(b) by 1187 days.

(21) Appl. No.: 10/631,598

(22) Filed: Jul. 31, 2003

(65) Prior Publication Data
US 2004/0059714 A1 Mar. 25, 2004

Related U.S. Application Data

(60) Provisional application No. 60/400,392, filed on Jul. 31, 2002.

(51) Int. Cl.
G06F 9/46 (2006.01)
G06F 15/02 (2006.01)

(52) U.S. Cl. ........................... 705/7.19; 705/7.16
(58) Field of Classification Search ............... 705/9
See application file for complete search history.

(56) References Cited

U.S. PATENT DOCUMENTS

| | | | |
|---|---|---|---|
| 4,591,974 A | 5/1986 | Dornbush et al. | |
| 4,667,292 A | 5/1987 | Mohlenbrock et al. | |
| 4,839,806 A | 6/1989 | Goldfischer et al. | |
| 4,893,270 A | 1/1990 | Beck et al. | |
| 4,937,743 A | 6/1990 | Rassman et al. | |
| 4,962,475 A | 10/1990 | Hernandez et al. | |
| 5,072,383 A | 12/1991 | Brimm et al. | |
| 5,072,412 A | 12/1991 | Henderson, Jr. et al. | |
| 5,072,838 A | 12/1991 | Price, Jr. et al. | |
| 5,077,666 A | 12/1991 | Brimm et al. | |
| 5,088,981 A | 2/1992 | Howson et al. | |
| 5,101,476 A | 3/1992 | Kukla | |
| 5,253,362 A | 10/1993 | Nolan et al. | |
| 5,301,105 A | 4/1994 | Cummings, Jr. | |
| 5,319,543 A | 6/1994 | Wilhelm | |
| 5,325,478 A | 6/1994 | Shelton et al. | |
| 5,347,578 A | 9/1994 | Duxbury | |
| 5,361,202 A | 11/1994 | Doue | |

(Continued)

FOREIGN PATENT DOCUMENTS
WO WO-96/13790 A1 5/1996
(Continued)

OTHER PUBLICATIONS

IBM Research Disclosure, "Comprehensively managed user workspace," IBM, vol. 42, No. 421, May 1, 1999, 5 pages.

(Continued)

Primary Examiner — Andre Boyce
(74) Attorney, Agent, or Firm — Boyle Fredrickson, S.C.

(57) ABSTRACT

A method of providing a healthcare provider the ability to schedule an appointment including receiving a patient's requested appointment from an appointment scheduler; receiving an initial visit type from the appointment scheduler corresponding to the requested appointment; scheduling the requested appointment when it is determined that the requested appointment corresponds to a basic appointment; and providing the appointment scheduler with a set of decision support tools and responding to the requested appointment, when it is determined that the requested appointment corresponds to a complex appointment.

22 Claims, 12 Drawing Sheets

U.S. PATENT DOCUMENTS

| | | | |
|---|---|---|---|
| 5,428,778 A | 6/1995 | Brookes | |
| 5,450,593 A | 9/1995 | Howell et al. | |
| 5,471,382 A | 11/1995 | Tallman et al. | |
| 5,546,580 A | 8/1996 | Seliger et al. | |
| 5,557,515 A | 9/1996 | Abbruzzese et al. | |
| 5,574,828 A | 11/1996 | Hayward et al. | |
| 5,596,752 A | 1/1997 | Knudsen et al. | |
| 5,603,026 A | 2/1997 | Demers et al. | |
| 5,666,492 A | 9/1997 | Rhodes et al. | |
| 5,692,125 A | 11/1997 | Schloss et al. | |
| 5,724,584 A | 3/1998 | Peters et al. | |
| 5,740,800 A | 4/1998 | Hendrickson et al. | |
| 5,748,907 A | 5/1998 | Crane | |
| 5,751,958 A | 5/1998 | Zweben et al. | |
| 5,758,095 A | 5/1998 | Albaum et al. | |
| 5,760,704 A | 6/1998 | Barton et al. | |
| 5,772,585 A | 6/1998 | Lavin et al. | |
| 5,774,650 A | 6/1998 | Chapman et al. | |
| 5,778,346 A | 7/1998 | Frid-Nielsen et al. | |
| 5,781,442 A | 7/1998 | Engleson et al. | |
| 5,781,890 A | 7/1998 | Nematbakhsh et al. | |
| 5,802,253 A | 9/1998 | Gross et al. | |
| 5,823,948 A | 10/1998 | Ross, Jr. et al. | |
| 5,832,450 A | 11/1998 | Myers et al. | |
| 5,833,599 A | 11/1998 | Schrier et al. | |
| 5,838,313 A | 11/1998 | Hou et al. | |
| 5,842,976 A | 12/1998 | Williamson | |
| 5,845,253 A | 12/1998 | Rensimer et al. | |
| 5,848,393 A | 12/1998 | Goodridge et al. | |
| 5,848,395 A | 12/1998 | Edgar et al. | |
| 5,850,221 A | 12/1998 | Macrae et al. | |
| 5,867,688 A | 2/1999 | Simmon et al. | |
| 5,867,821 A | 2/1999 | Ballantyne et al. | |
| 5,899,998 A | 5/1999 | McGauley et al. | |
| 5,907,829 A | 5/1999 | Kida | |
| 5,915,240 A | 6/1999 | Karpf | |
| 5,924,074 A | 7/1999 | Evans | |
| 5,929,851 A | 7/1999 | Donnelly | |
| 5,946,659 A | 8/1999 | Lancelot et al. | |
| 5,950,168 A | 9/1999 | Simborg et al. | |
| 5,960,406 A | 9/1999 | Rasansky et al. | |
| 5,970,466 A * | 10/1999 | Detjen et al. | 705/8 |
| 5,974,389 A | 10/1999 | Clark et al. | |
| 5,983,210 A | 11/1999 | Imasaki et al. | |
| 5,987,498 A | 11/1999 | Athing et al. | |
| 5,997,476 A | 12/1999 | Brown | |
| 5,999,916 A | 12/1999 | Peters et al. | |
| 6,014,631 A | 1/2000 | Teagarden et al. | |
| 6,016,477 A | 1/2000 | Ehnebuske et al. | |
| 6,021,404 A | 2/2000 | Moukheibir | |
| 6,029,138 A | 2/2000 | Khorasani et al. | |
| 6,037,940 A | 3/2000 | Schroeder et al. | |
| 6,047,259 A | 4/2000 | Campbell et al. | |
| 6,063,026 A | 5/2000 | Schauss et al. | |
| 6,067,523 A | 5/2000 | Bair et al. | |
| 6,081,786 A | 6/2000 | Barry et al. | |
| 6,082,776 A | 7/2000 | Feinberg | |
| 6,139,494 A | 10/2000 | Cairnes | |
| 6,154,726 A | 11/2000 | Rensimer et al. | |
| 6,182,047 B1 | 1/2001 | Dirbas | |
| 6,185,689 B1 | 2/2001 | Todd, Sr. et al. | |
| 6,188,988 B1 | 2/2001 | Barry et al. | |
| 6,263,330 B1 | 7/2001 | Bessette | |
| 6,266,675 B1 | 7/2001 | Evans et al. | |
| 6,272,593 B1 | 8/2001 | Dujari | |
| 6,275,150 B1 | 8/2001 | Mandler et al. | |
| 6,279,033 B1 | 8/2001 | Selvarajan et al. | |
| 6,283,761 B1 | 9/2001 | Joao | |
| 6,289,368 B1 | 9/2001 | Dentler et al. | |
| 6,304,905 B1 | 10/2001 | Clark | |
| 6,317,719 B1 | 11/2001 | Schrier et al. | |
| 6,332,167 B1 | 12/2001 | Peters et al. | |
| 6,345,260 B1 | 2/2002 | Cummings, Jr. et al. | |
| 6,381,615 B2 | 4/2002 | Gaither et al. | |
| 6,389,454 B1 | 5/2002 | Ralston et al. | |
| 6,401,072 B1 | 6/2002 | Haudenschild et al. | |
| 6,415,275 B1 | 7/2002 | Zahn | |
| 6,516,324 B1 | 2/2003 | Jones et al. | |
| 6,522,875 B1 | 2/2003 | Dowling et al. | |
| 6,678,698 B2 | 1/2004 | Fredell et al. | |
| 6,725,200 B1 | 4/2004 | Rost | |
| 6,757,898 B1 | 6/2004 | Ilsen et al. | |
| 6,856,989 B1 | 2/2005 | Zhou et al. | |
| 7,337,123 B2 * | 2/2008 | Dvorak et al. | 705/8 |
| 2001/0016056 A1 | 8/2001 | Westphal et al. | |
| 2001/0016853 A1 | 8/2001 | Kucala | |
| 2001/0049610 A1 | 12/2001 | Hazumi | |
| 2001/0051888 A1 | 12/2001 | Mayhak, Jr. et al. | |
| 2001/0056433 A1 | 12/2001 | Adelson et al. | |
| 2002/0001375 A1 | 1/2002 | Alcott et al. | |
| 2002/0001387 A1 | 1/2002 | Dillon | |
| 2002/0002473 A1 | 1/2002 | Schrier et al. | |
| 2002/0002535 A1 | 1/2002 | Kitchen et al. | |
| 2002/0007287 A1 | 1/2002 | Straube et al. | |
| 2002/0046346 A1 | 4/2002 | Evans | |
| 2002/0059082 A1 * | 5/2002 | Moczygemba | 705/3 |
| 2002/0062229 A1 | 5/2002 | Alban et al. | |
| 2002/0156672 A1 * | 10/2002 | Burko | 705/9 |
| 2002/0188478 A1 | 12/2002 | Breeland et al. | |
| 2002/0191035 A1 * | 12/2002 | Selent | 345/866 |
| 2003/0061072 A1 | 3/2003 | Baker et al. | |
| 2003/0105648 A1 | 6/2003 | Schurenberg et al. | |
| 2003/0110059 A1 | 6/2003 | Janas, III et al. | |
| 2003/0200726 A1 | 10/2003 | Rast | |
| 2004/0017475 A1 | 1/2004 | Akers et al. | |
| 2004/0034833 A1 | 2/2004 | Kougiouris et al. | |
| 2005/0027580 A1 * | 2/2005 | Crici et al. | 705/8 |
| 2005/0102146 A1 | 5/2005 | Lucas et al. | |

FOREIGN PATENT DOCUMENTS

| | | |
|---|---|---|
| WO | WO 96/27163 | 9/1996 |
| WO | WO 98/13783 | 4/1998 |
| WO | WO 99/22330 | 5/1999 |
| WO | WO-99/41682 A2 | 8/1999 |
| WO | WO 99/44162 | 9/1999 |
| WO | WO 99/63473 | 12/1999 |
| WO | WO 00/28460 | 5/2000 |
| WO | WO 00/29983 | 5/2000 |
| WO | WO 00/65522 | 11/2000 |
| WO | WO-02/29664 A1 | 4/2002 |

OTHER PUBLICATIONS

Bakman et al., Enhancing a WIMP based interference with Speech, Gaze tracking and Agents, 4 pages.

CPRS Gui, CPRS V 1.0 Clinician Guide, Apr. 26, 1999, 36 pages.

Kennedy Health, http://thunder/idxweb/idxps/patientservices.asp, 1999, 10 pages.

Leavitt et al., "Case Study: Giving Patients Online Access to Their Health Records," Presentation, Feb. 2000, 40 pages.

Miller, "Towards MedicaLogic.com, An Internet Strategy," MedicLogic, May 1999, 7 pages.

INHS/IRM-Inland Northwest Health Services, Mar. 2, 1999, 7 pages.

"Integrate About My Health Into Your Practice," MedicaLogic/Medscape, Inc., 2001, 5 pages.

Aboutmyhealth.net, website, Aug. 10, 1999, 27 pages.

Woody, "Why Your Medical File Belongs Online," PCWorld.com, Jul. 23, 1999, 2 pages.

"Integrate 98point6 Into Your Practice," MediaLogic, Inc., 2000, 16 pages.

Streveler, "eHealthcare is Reconnecting the Healthcare Industry," Mar. 20, 2000, 35 pages.

Leavitt, "MedicaLogic.com: @ the point of Care," Presentation, 1999, 7 pages.

"Moving Healthcare to the Web," The ChannelHealth, Dec. 9, 1999, 46 pages.

"IDX and ChannelHealth—The Competition," May 15, 2000, 27 pages.

Gray, "PING—The Personal Internetworked Notary and Guardian," Children's Hospital Informatics Program, http://www.chip.org/research/ping.htm, Nov. 9, 2001, 17 pages.

Fletcher, "Current issues in confidentiality: Computerized information systems, medical records, and patient rights," ACM SIGCAS Computers and Society, vol. 16, Issue 2-3, Summer/Fall 1986, pp. 8-18.

"Sunrise Knowledge-Based Orders," Advanced Clinical Solutions, ECLIPSYS, www.eclipsys.com, Dec. 2002, 4 pages.

"Sunrise Clinical Manager," Advanced Clinical Solutions, ECLIPSYS, www.eclipsys.com, Dec. 2002, 4 pages.

"News & events," ECLIPSYS, www.eclipsys.com, Apr. 16, 2002, 3 pages.

"Horizon Clinicals," McKesson Corporation, www.mckesson.com, 2003, 2 pages.

"Acute Care EMR—Solutions," Cerner Corporation, www.cerner.com, 2002-2003, 2 pages.

"Foundation," IDX Systems Corporation, www.idx.com, 1999-2004, 2 pages.

"Supporting the Work of Clinicians," IDX Systems Corporation, www.idx.com, 1999-2004, 1 page.

"AUTONOMY Update™," production brief, 2 pages.

"Brio.Portal," product information sheet, 1 page.

"Portal-in-a-Box™," Product Brief, Autonomy Inc., www.automony.com, Apr. 2002, 6 pages.

"Actuate Software," Sun Solutions Catalog, Actuate Corporation & Sun Microsystems, www.sun.com, 2002, 24 pages.

Hazumi et al., "Development of Electronic Medical Record System," NEC Research & Development, vol. 41, No. 1, Jan. 2000, pp. 102-105.

McDonald et al., "The Regenstrief Medical Record System: a quarter century experience," International Journal of Medical Informatics, vol. 54, 1999, pp. 225-253.

"CDR-Web," Reliance Software Systems, Website, 2000, 1 page.

Marietti, "'O' Pioneers!," Healthcare Informatics, Website, May 1999, 9 pages.

Johnson, "Today's CDRs: The Elusive Complete Solution," Healthcare Informatics, (Website), Jul. 1997, 7 pages.

Andrew et al., "Computer-Based Patient Records—Venturing Off the Beaten Path: It's Time to Blaze New CPR Trails," Healthcare Informatics, (Website), May 1997, 17 pages.

"EMR Features," Care Is #1, 1999-2000, 1 page.

"Enterprise Systems Management," Cerner Corporation, www.cerner.com, Sep. 13, 2001, 5 pages.

"HealthMatics™ Office", Healthmatics Office, Website, 3 pages, (date unknown).

Clinicomp, Intl., Website, 1999-2000, 1 page.

"ExcelCare Windows", Website, 2 pages (date unknown).

"IC-Chart Information", Integreat, Website, 1 page, (date unknown).

"Managing mail messages with rules," Microsoft Outlook Help Manual, Website, Version 6, 5 pages Jun. 24, 2002.

Mercando, "Appointment Scheduling on Computer", PACE, vol. 20, Jul. 1997, pp. 1860-1862.

EncounterPRO, the Workflow Enabled CPR/EMR from JMJ Technologies, JMJ Technologies, Inc., www.jmjtech.com, Nov. 8, 2002, 6 pages.

"Expeditor Systems—The Patient Flow Systems Experts", Expeditor Systems, www.expeditor.com, 2001, 3 pages.

"Working with Patient Lists," EpicCare Inpatient Electronic Medical Record Jul. 2000 User's Guide, Epic Systems Corp., Section 10.5-10.6, 3 pages.

"Patient Lists," EpicCare Inpatient Electronic Medical Record Jul. 2000 User's Guide, Epic Systems Corp., Section 11.3-11.4, 3 pages.

"Oacis—Census Management," Dinmar (U.S.) Inc., www.oacis.com, 2002, 2 pages.

Grimson et al., "Interoperability Issues in Sharing Electronic Healthcare Records—the Synapses Approach," IEEE, 1997, pp. 180-185.

"Clinician Documentation with EMR," Clinicomp, Intl., www.clinicomp.com, 1999-2002, 1 page.

"Essentris™ CPOE", Clinicomp, Intl., www.clinicomp.com, 1999-2002, 2 pages.

"Essentris™ GDR," Clinicomp, Intl., www.clinicomp.com, 1999-2002, 2 pages.

"Intensivist Tools," Clinicomp, Intl., www.clinicomp.com, 1999-2002, 2 pages.

"CMRxp—Computerized Medical Records Powered by Experience!!," Electronic Medical Records (EMR)xp Experience, Chartcare, Inc., www.chartcare.com, Mar. 5, 2003, 2 pages.

"Dr-InBasket-Lab Results, Messaging and To-Do's," Chartcare, Inc., www.chartcare.com, Mar. 5, 2003, 3 pages.

"PatInfo-Patient Information Handouts," PatInfo-Patient Demographics Software, Chartcare, Inc., www.chartcare.com, Mar. 5, 2003, 2 pages.

"Recall-Patient Health Maintenance," Chartcare, Inc., www.chartcare.com, Mar. 5, 2003, 3 pages.

"LabTrack-Lab Ordering & Results Tracking," LabTrack-Lab Result Tracking Software, Chartcare, Inc., www.chartcare.com, Mar. 5, 2003, 3 pages.

"Rx-MedTrack-Prescription Writing/Medication Tracking," Rx-MedTrack-Prescription Writing Software, Chartcare, Inc., www.chartcare.com, Mar. 5, 2003, 2 pages.

"The Right Tools," Product Description, Integreat Inc., www.igreat.com, 2003, 1 page.

"IC-Chart Additional Modules," Integreat Inc., www.igreat.com, 2003, 2 pages.

"Services," Integreat Inc., www.igreat.com, 2003, 2 pages.

Egan et al., "Computers and Networks in Medical and Healthcare Systems," Comput. Biol. Med., vol. 25, No. 3, 1995, pp. 355-365.

Van De Velde, "Framework for a Clinical Information System," International Journal of Medical Informatics, vol. 57, 2000, pp. 57-72.

Fabbretti et al., "Applying the Object Paradigm to a Centralized Database for a Cardiology Division," International Journal of Bio-Medical Computing, vol. 42, 1996, pp. 129-134.

Plaisant et al., "An Information Architecture to Support the Visualization of Personal Histories," Information Processing & Management, vol. 34, No. 5, 1998, pp. 581-597.

Beckham, J. Daniel, "The engine of choice," Healthcare Forum Journal, vol. 39, No. 4, Jul./Aug. 1996.

Ho et al. Introducing variable-interval appointment scheduling rules in service systems, International Journal of Operations and Production Management, vol. 15, No. 6, 1995.

"HCS Order Communications Module," web.archive.org/hcsinteractant.com, 2000, pp. 1-3.

Ebida et al., "Getting Data Out of the Electronic Patient Record: Critical Steps in Building a Data Warehouse for Decision Support," SIMS University Health Network, Dept. of Medicine, University of Toronto, Canada, Nov. 8, 1999, pp. 1-5.

"Patient1 Vista", PerSe Technologies, www.per-se.com/web.archive.org, 2000, 2 pages.

"Sunrise Clinical Manager", Eclipsys, Sunrise Clinical Overview, www.eclipsnet.com/web.archive.org, 1999, 1 page.

"American Medical Management Selects Tandem Computers as Systems Partner", PR Newswire, Feb. 20,1997, 2 pages.

"Premier Members Select Cerner's Clinical Data Repository as a Result of Exclusive Endorsement", PR Newswire, Feb. 19, 1997, 2 pages.

"Physicians and Staff Go Online with Cerner's Clinical Data Repository and Orders Management", PR Newswire, Mar. 4, 1996, 2 pages.

"Patient1", PerSe Technologies, www.per-se.com/web.archive.org, 2000, 4 pages.

* cited by examiner

FIG. 10

Assumes variables: Array of Codes; Current Appointment Department; Whether Coordinated Visit
Returns: Scheduling Array of Visit Types, Providers, Departments to schedule for 1. Quit if nothing in Array of Codes.

2. Store Array of Codes in a Temporary Array.

3. Go Through the Array of Codes and find the treatment types with Visit type Codes and sum up the in the Code fields to determine a final length.

4. Go Through the Array of Codes and find the treatment types with Pre-visit Preparation Codes.

5. If there is any Pre-visit Preparation Code Type in the Array of Codes and the Visit is Coordinated then generate a warning and quit.

6. If there are more than one Pre-visit Preparation code types in the Array of Codes and the Visit is Coordinated then generate a warning and quit.

7. Take the summed up length in step 3 and find the corresponding treatment type with the next highest total length and code type as Visit type code.

8. Erase the elements in the Array of Codes.

9. Take the Codes determined in steps 4 and 7 and create a new Array Codes.

10. Call a proprietary function sending the Array of codes in step 9 to find the corresponding Visit Types, Providers and Departments to schedule for.

11. Put the results of the function in step 10 into the Scheduling Array.

12. Erase the elements in the Array of Codes.

13. Copy back the elements of the temporary array made in step 2 into the Array of codes to be used in the next programming point.

14. Send the Scheduling Array to the user interface to replace initial user input with the results of the decision support programming point.

SYSTEM AND METHOD FOR PROVIDING DECISION SUPPORT TO APPOINTMENT SCHEDULERS IN A HEALTHCARE SETTING

CROSS-REFERENCE TO RELATED APPLICATION

This application claims priority to U.S. Provisional Application Ser. No. 60/400,392, entitled "System And Method For Providing Decision Support To Appointment Schedulers In A Healthcare Setting" filed Jul. 31, 2002, the disclosure of which is hereby expressly incorporated herein by reference.

TECHNICAL FIELD

This patent relates generally to health record management, and more particularly, this patent relates to a system and method for providing decision support to appointment schedulers in ambulatory care clinics and hospitals.

BACKGROUND

Scheduling appointments in a healthcare setting is an exercise that ranges from very easy to very complex. In an ambulatory care clinic, appointments such as routine office visits and physician consults are relatively easy to schedule, but some patient visits require multiple providers and many different but related individual visits paneled together. Some specialty visits require lengthy procedures with heavily booked rooms and equipment, and there are many visits for which scheduling should not occur due to pregnancies or metallic implants, or drug interactions. In hospitals and specialty care facilities such as oncology and cardiology centers, the types of visits patients require may have very strict time, drug, and procedure requirements. Further complicating things is the fact that many providers, resources, rooms, or machines should not be scheduled for certain visits, or at certain times, etc.

In addition, due to the way that Medicare reimburses organizations, many facilities need to check procedures to determine whether they are medically necessary based on Local Medicare Review Policies (LMRP) and Correct Coding Initiative (CCI) warnings. These checks examine procedure-diagnosis pairings and multiple procedure orders to see whether they are authorized according to current guidelines.

But apart from the straightforward complexities of scheduling appointments, there is the importance of doing it properly, which is driven by the operational and billing protocols of each organization and by the risks associated with not providing appropriate patient care. Inappropriate visit type selection by schedulers can impact the care delivered to patients and can cause problems with resource availability in tightly booked and heavily scheduled environments. Furthermore, inappropriate visit type selection by schedulers can cause problems with collecting the right copays when the copays in a given benefit plan vary depending on the type of visit.

For all these reasons, it is incumbent upon schedulers to select the right visit types for patients. And it should be incumbent upon a healthcare information system's scheduling component to provide every possible aid to schedulers in selecting the right visit type.

Typical solutions to these problems have involved creating a catalog of available treatment types (which can number in the 100's or 1000's) from which the scheduler must make the correct selection. This often required some tools to be developed to aid the scheduler in that selection, such as naming or numbering schemes for the visit types, help files or on screen instructions. But quite often, it is acquired knowledge on the part of the scheduler that is his or her greatest aid.

There is a demonstrated need for a system that is able to provide flexible decision support for complex scheduling requirements to appointment schedulers at the point of visit type selection in a healthcare information system.

BRIEF DESCRIPTION OF THE DRAWINGS

FIG. 10 is an example of pseudo code representing some code a healthcare organization may write into the programming point logic to be applied when a scheduler has supplied the secondary input on a decision support form.

DETAILED DESCRIPTION

Figure 1:
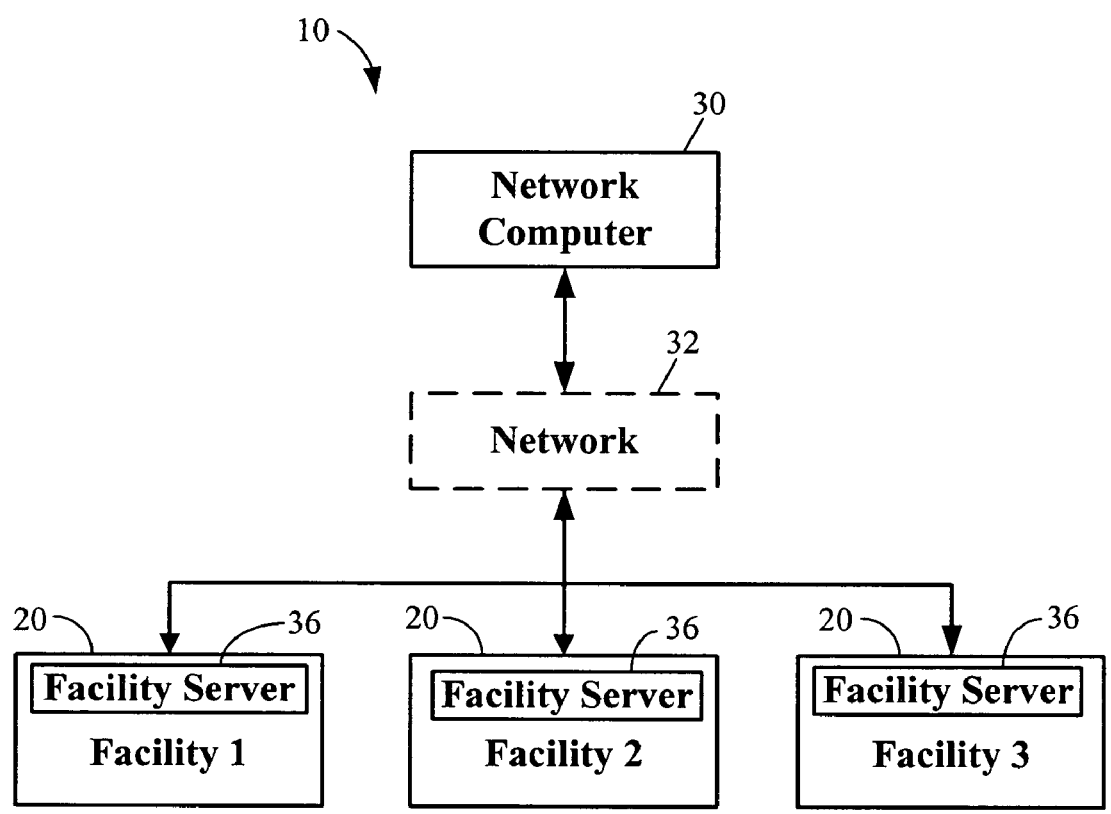
FIG. 1 is a block diagram of an exemplary general purpose data network.

FIG. 1 illustrates an embodiment of an enterprise-wide data network 10 including a first group of healthcare facilities 20 operatively coupled to a network computer (i.e. machine) 30 via a network 32. The plurality of healthcare facilities 20 may be located, by way of example rather than limitation, in separate geographic locations from each other, in different areas of the same city, or in different states. The network 32 may be provided using a wide variety of techniques well known to those skilled in the art for the transfer of electronic data. For example, the network 32 may comprise dedicated access lines, plain ordinary telephone lines, satellite links, combinations of these, etc. Additionally, the network 32 may include a plurality of network computers or server computers (not shown), each of which may be operatively interconnected in a known manner. Where the network 32 comprises the Internet, data communication may take place over the network 32 via an Internet communication protocol.

The network computer 30 may be a server computer of the type commonly employed in networking solutions. The network computer 30 may be used to accumulate, analyze, and download data relating to a healthcare facility's medical records. For example, the network computer 30 may periodically receive data from each of the healthcare facilities 20 indicative of information pertaining to a patient's medical record, billing information, employee data, etc. The healthcare facilities 20 may include one or more facility servers 36 that may be utilized to store information for a plurality of patients/employees/accounts/etc. associated with each facility.

Although the enterprise-wide data network 10 is shown to include one network computer 30 and three healthcare facilities 20, it should be understood that different numbers of computers and healthcare facilities may be utilized. For example, the network 32 may include a plurality of network computers 30 and dozens of healthcare facilities 20, all of which may be interconnected via the network 32. According to the disclosed example, this configuration may provide several advantages, such as, for example, enabling near real time uploads and downloads of information as well as periodic uploads and downloads of information. This provides for a primary backup of all the information generated in the process of updating and accumulating healthcare data.

Figure 2:
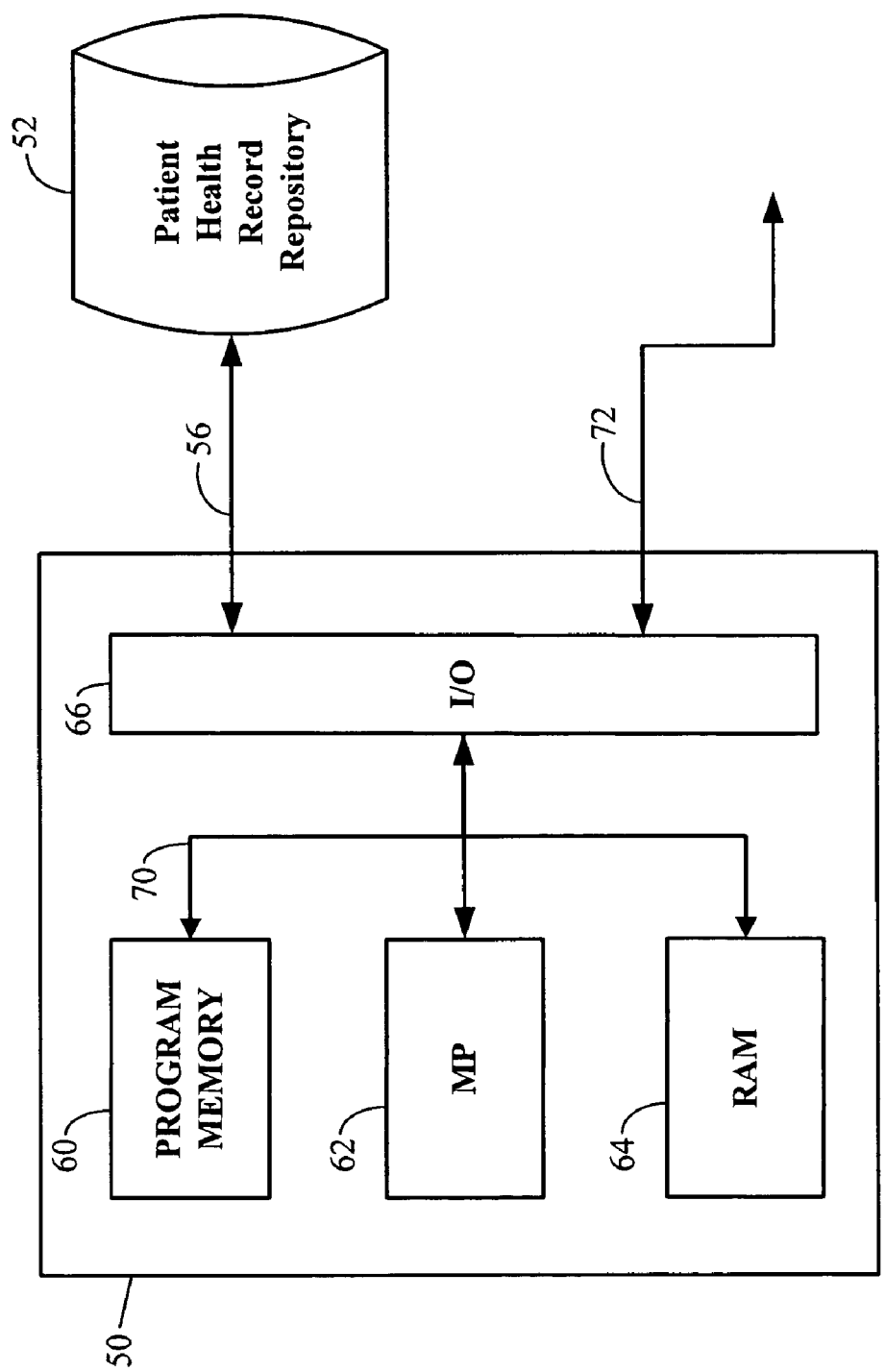
FIG. 2 is a schematic diagram of an embodiment of a network computer.

FIG. 2 is a schematic diagram of one possible embodiment of the network computer 30 shown in FIG. 1. The network computer 30 may have a controller 50 that is operatively connected to a patient health record repository 52 (such as a Universal Patient Record repository) via a link 56. The patient health record repository 52 may include one or more databases or data repositories that store patient healthcare data and related healthcare business data using one or more database management systems that run on one or more computing platforms on one or more computing devices. It should be noted that, while not shown, any additional databases or repositories may be linked to the controller 50 in a similar manner.

The controller 50 may include a program memory 60, a microcontroller or a microprocessor (MP) 62, a random-access memory (RAM) 64, and an input/output (I/O) circuit 66, all of which may be interconnected via an address/data bus 70. It should be appreciated that although only one microprocessor 62 is shown, the controller 50 may include multiple microprocessors 62. Similarly, the memory of the controller 50 may include multiple RAMs 64 and multiple program memories 60. Although the I/O circuit 66 is shown as a single block, it should be appreciated that the I/O circuit 66 may include a number of different types of I/O circuits. The RAM(s) 64 and programs memories 60 may be implemented as semiconductor memories, magnetically readable memories, and/or optically readable memories, for example. The controller 50 may also be operatively connected to the network 32 via a link 72.

Figure 3:
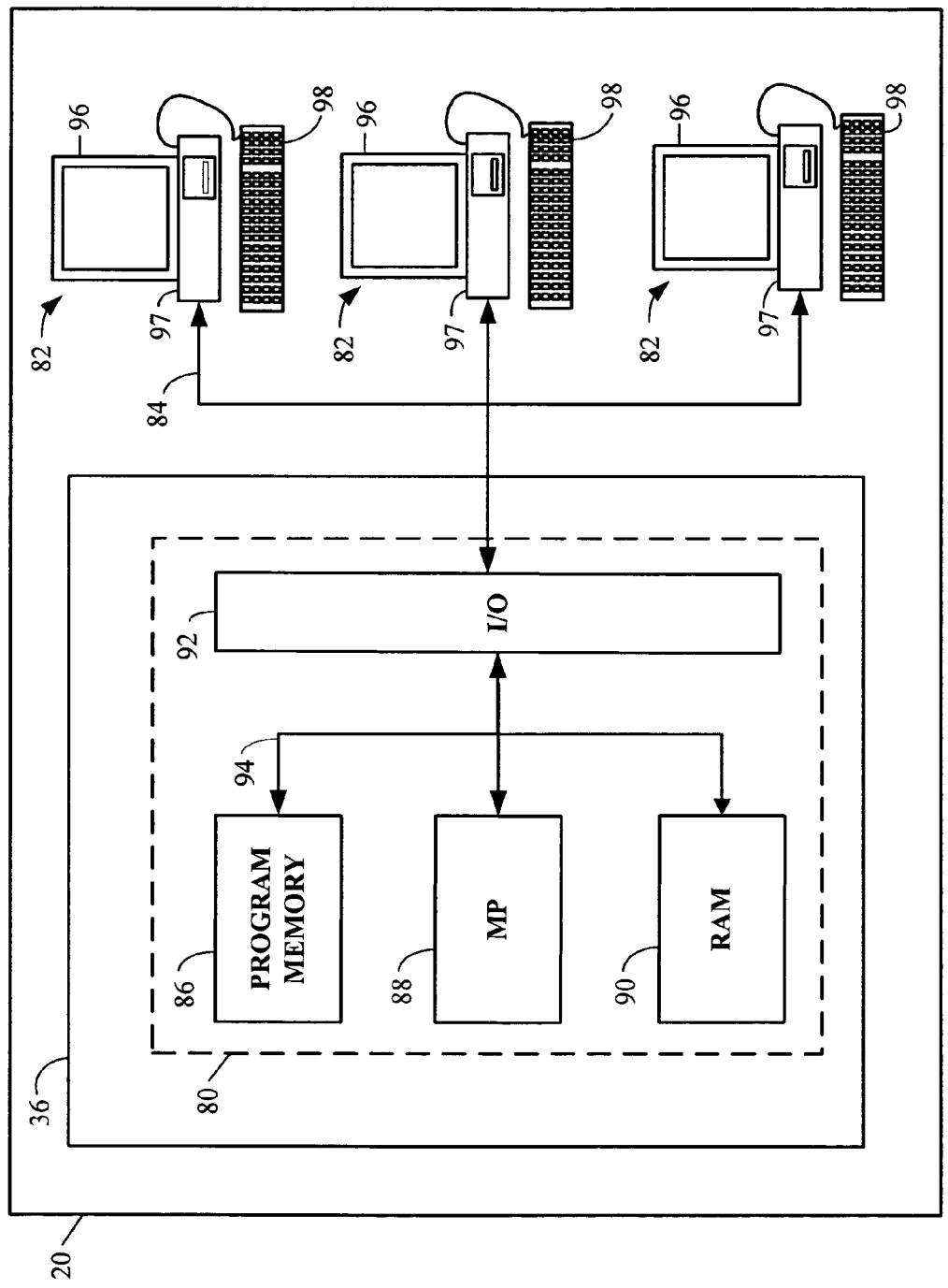
FIG. 3 is an exemplary schematic diagram of several system components located in a healthcare facility.

FIG. 3 is a schematic diagram of one possible embodiment of several components located in one or more of the healthcare facilities 20 from FIG. 1. Although the following description addresses the design of the healthcare facilities 20, it should be understood that the design of one or more of the healthcare facilities 20 may be different than the design of other healthcare facilities 20. Also, each healthcare facility 20 may have various different structures and methods of operation. It should also be understood that the embodiment shown in FIG. 3 illustrates some of the components and data connections present in a healthcare facility, however it does not illustrate all of the data connections present in a typical healthcare facility. For exemplary purposes, one design of a healthcare facility is described below, but it should be understood that numerous other designs may be utilized.

The healthcare facilities 20 may have a facility server 36, which includes a controller 80, wherein the facility server 36 is operatively connected to a plurality of client device terminals 82 via a network 84. The network 84 may be a wide area network (WAN), a local area network (LAN), or any other type of network readily known to those persons skilled in the art. The client device terminals 82 may also be operatively connected to the network computer 30 from FIG. 1 via the network 32.

Similar to the controller 50 from FIG. 2, the controller 80 may include a program memory 86, a microcontroller or a microprocessor (MP) 88, a random-access memory (RAM) 90, and an input/output (I/O) circuit 92, all of which may be interconnected via an address/data bus 94. As discussed with reference to the controller 50, it should be appreciated that although only one microprocessor 88 is shown, the controller 80 may include multiple microprocessors 88. Similarly, the memory of the controller 80 may include multiple RAMs 90 and multiple programs memories 86. Although the I/O circuit 92 is shown as a single block, the I/O circuit 92 may include a number of different types of I/O circuits. The RAM(s) 90 and programs memories 86 may also be implemented as semiconductor memories, magnetically readable memories, and/or optically readable memories, for example. All of these memories or data repositories may be referred to as machine-accessible mediums.

For the purpose of this description and a briefly discussed above, a machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM); random access memory (RAM); magnetic disk storage media; optical storage media; flash memory devices; etc.), as well as electrical, optical, acoustical or other form of propagated signals (e.g., carrier waves, infrared signals, digital signals, etc.); etc.

The client device terminals 82 may include a display 96, a controller 97, a keyboard 98 as well as a variety of other input/output devices (not shown) such as a printer, mouse, touch screen, track pad, track ball, isopoint, voice recognition system, etc. Each client device terminal 82 may be signed onto and occupied by a healthcare employee to assist them in performing their duties. Healthcare employees may sign onto a client device terminal 82 using any generically available technique, such as entering a user name and password. If a healthcare employee is required to sign onto a client device terminal 82, this information may be passed via the link 84 to the facility server 36, so that the controller 80 will be able to identify which healthcare employees are signed onto the system and which client device terminals 82 the employees are signed onto. This may be useful in monitoring the healthcare employees' productivity.

Typically, facility servers 36 store a plurality of files, programs, and other data for use by the client device terminals 82 and the network computer 30. One facility server 36 may handle requests for data from a large number of client device terminals 82. Accordingly, each facility server 36 may typically comprise a high end computer with a large storage capacity, one or more fast microprocessors, and one or more high speed network connections. Conversely, relative to a typical facility server 36, each client device terminal 82 may typically include less storage capacity, a single microprocessor, and a single network connection.

Overall Operation of the System

One manner in which an exemplary system may operate is described below in connection with a block diagram overview and a number of flow charts which represent a number of portions or routines of one or more computer programs. These computer program portions may be stored in one or more of the memories in the controllers 50 and 80, and may be written at any high level language such as C, C++, or the like, or any low-level, assembly or machine language. By storing the computer program portions therein, various portions of the memories are physically and/or structurally configured in accordance with the computer program instructions.

Figure 4:
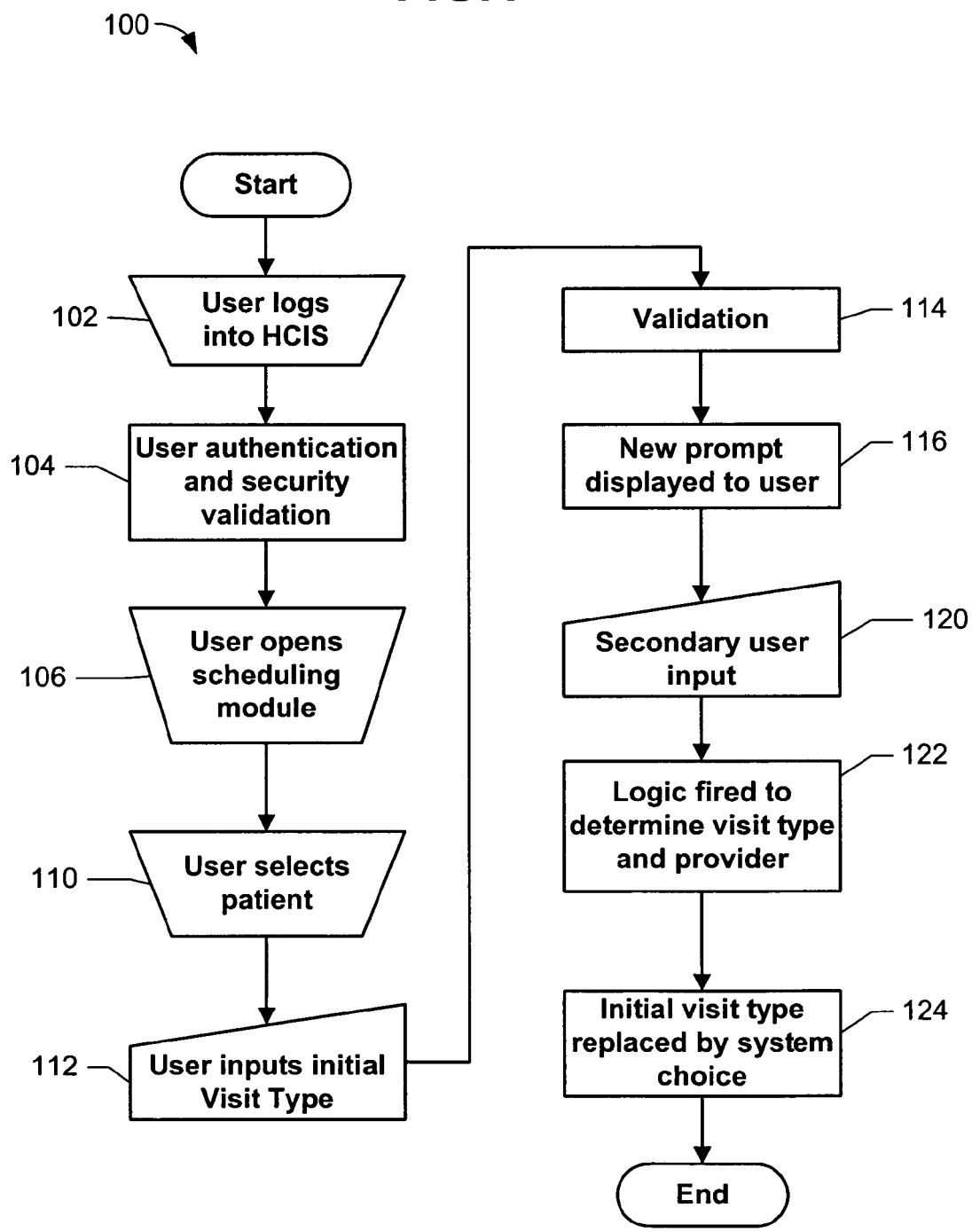
FIG. 4 is an exemplary flowchart overview depicting the workflow and interactions between a health care information system and a system user.

FIG. 4 is an exemplary flowchart overview 100 of the workflow and interactions between a healthcare information system (HCIS) and a system user, in this case an appointment scheduler.

As shown in the exemplary flowchart 100, a user logs into the HCIS at a block 102. At a block 104, basic user authentication and security validation happens. Additionally, this embodiment provides for automatic loading of typical login contexts, such as department, location, and facility, as well as commonly used workflows, reports, and user interface options.

At a block 106, the system user may open the scheduling module of the HCIS and select a patient at a block 110. Upon patient selection, the embodiment shown in FIG. 1 retains patient preferences, demographic, insurance coverage, primary care provider, referral and past and future appointment information in memory for later use by the scheduling module.

At a block 112, the user elects to make an appointment for the patient by entering an initial visit type into the system. A healthcare organization (HCO) may configure its HCIS in such a way that this initial input, when of a certain type, triggers the decision support mechanisms also built into the HCIS.

At a block 114, the system may evaluate the user's entry and run appropriate validation protocols to determine whether to simply accept the entry or to trigger a decision support mechanism, and if so, which one. Decision support mechanisms could be triggered only by the particular visit type entered by the current system user, by the particular department context that the system user has logged into (irrespective of the visit type being entered until that login context changes), or even system wide, for all users, in all departments, and for all visit types.

At a block 116, depending upon the results of the validation, the HCIS prompts the system user for additional information which the user provides at a block 120.

At a block 122, the HCIS takes the secondary user input at a block 120 and applies custom defined logic to determine appropriate visit type, provider, and department information which it might use to replace the system user's initial visit type input at a block 124.

Figure 5A:
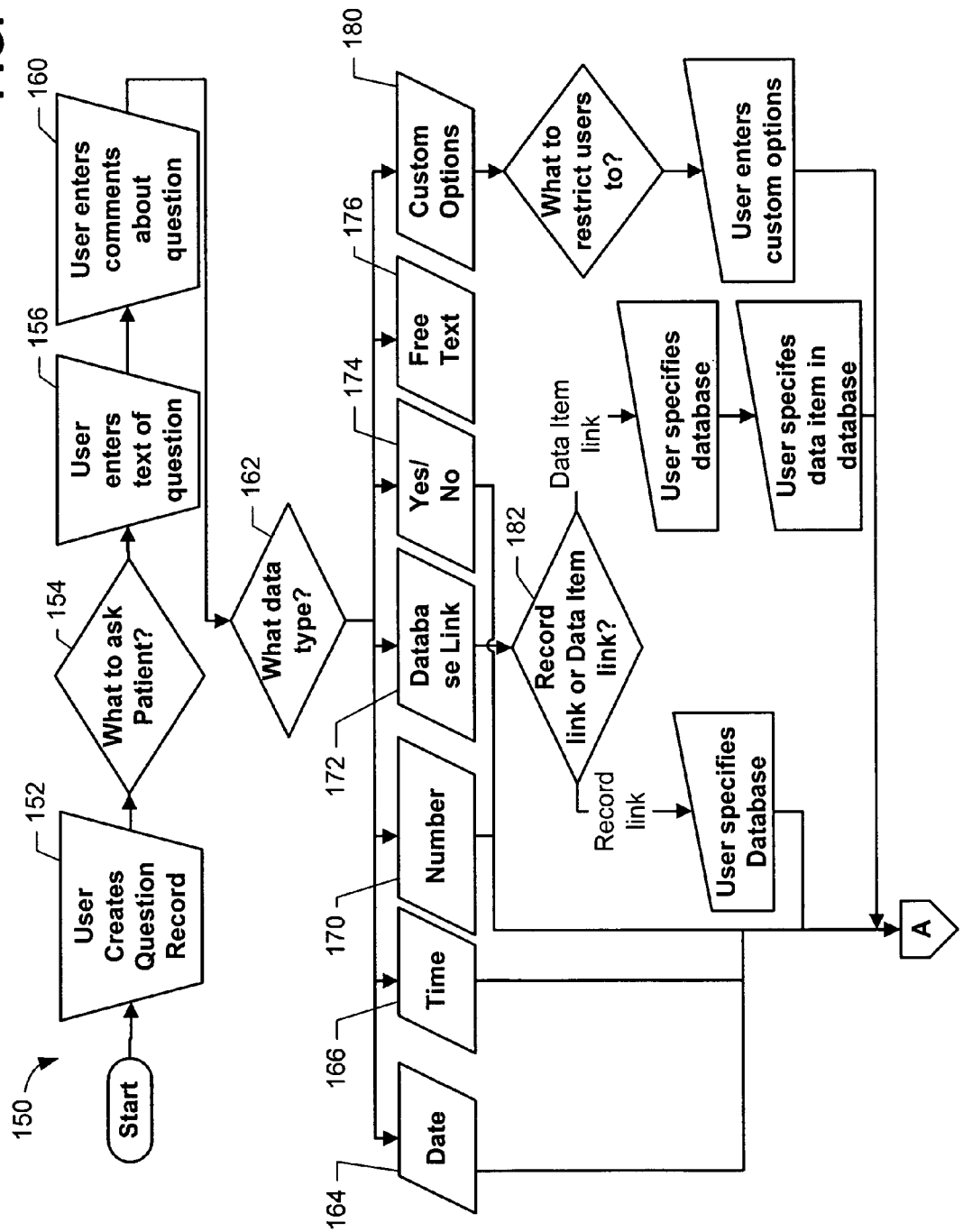
FIGS. 5A and 5B are an exemplary flowcharts illustrating some actions and decisions made in the creation of a questionnaire form.

FIG. 5A is an exemplary flowchart 150 depicting the actions and decisions used in the creation of a questionnaire form, which is one of the types of decision support available. In the flowchart 150 of FIGS. 5A and 5B, the HCO makes decisions about how to configure its HCIS. If the HCO would take advantage of the questionnaire type of decision support, it defines the questions used to prompt the scheduler for the secondary input.

At a block 152, the person configuring the system might create a question record. At a block 154, he decides what the scheduler will ask the patient and enters the text of that question at a block 156. At a block 160, he might enter some comments about that question to provide additional support to the scheduler.

At a block 162, he decides what type of data the question will be. Any given question can be either a date (164), a time (166), a number (170), a database link (172), a yes/no response (174), free text (176), or a list of custom options (180) as defined by the person creating the question record. If the question is to be a database link (172), then the person configuring the system would decide at a block 182 whether it would be a link to the records in a specified database or to a specific data item in a specified database.

Figure 5B:
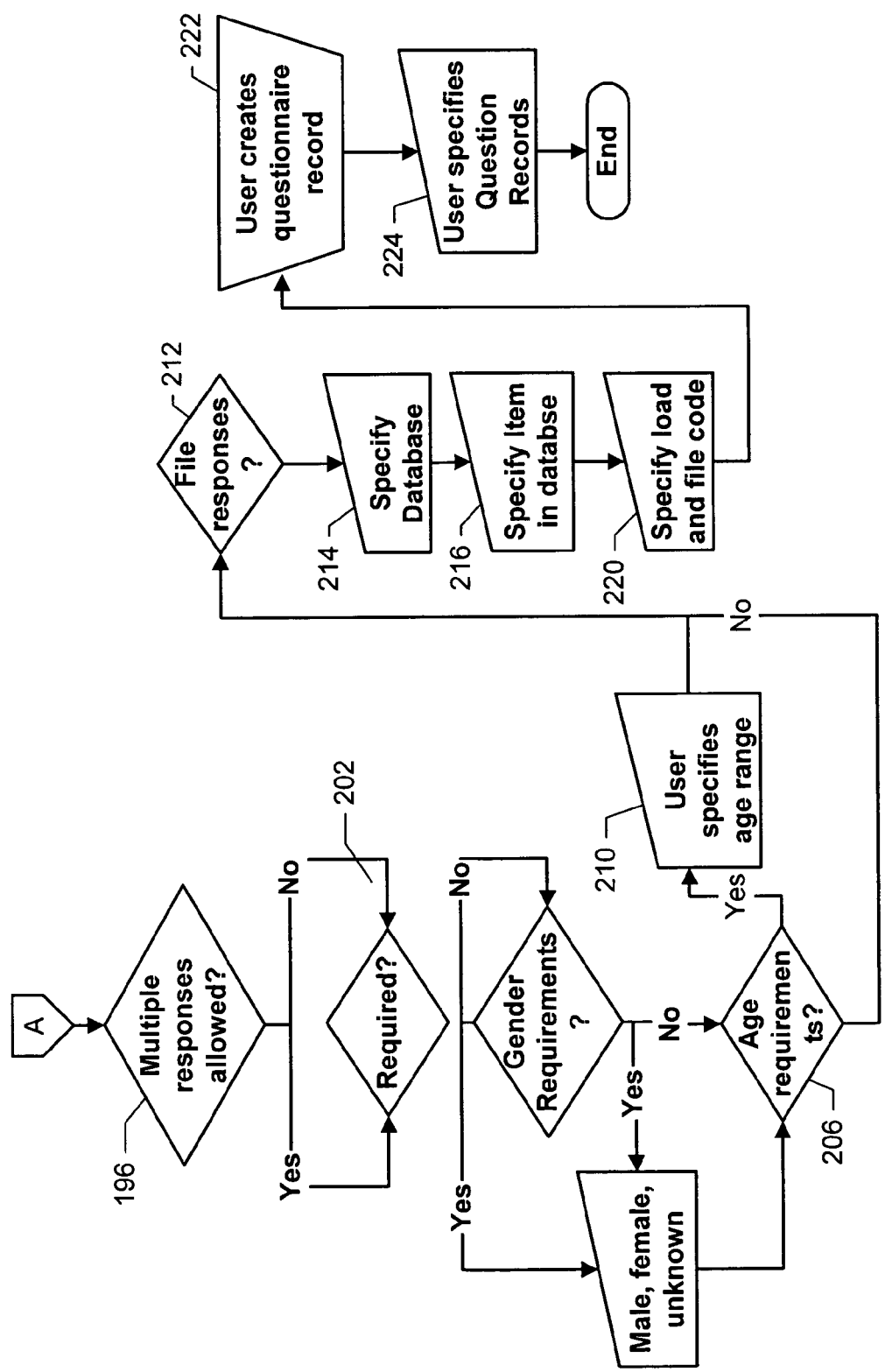

At a block 196 from FIG. 5B, the person configuring the system might decide whether the question can have multiple responses recorded for it, and at a block 200 he might decide whether it is a question that requires a response from the scheduler. At a block 202, he may decide whether to put gender requirements on the question. For example, if the question is related to pregnancy, a scheduler would only ask the question of a woman. At a block 206, he might decide whether to place age restrictions on the question. For example, if the question is related to a woman's menstrual cycle, a scheduler might only ask the question of women in a certain age range, which the person configuring the system would enter at a block 210.

At a block 212, the person configuring the system makes some decisions regarding the filing of responses to the question. He might specify a database in which to record the response (block 214), a particular item in that database to store the response (block 216), and/or any special code to be executed when the question is loaded or the response is filed (block 220).

At a block 222, the person configuring the system creates a questionnaire record which is a grouper containing all the question records he wants to display together to the scheduler as specified at a block 224.

Figure 6:
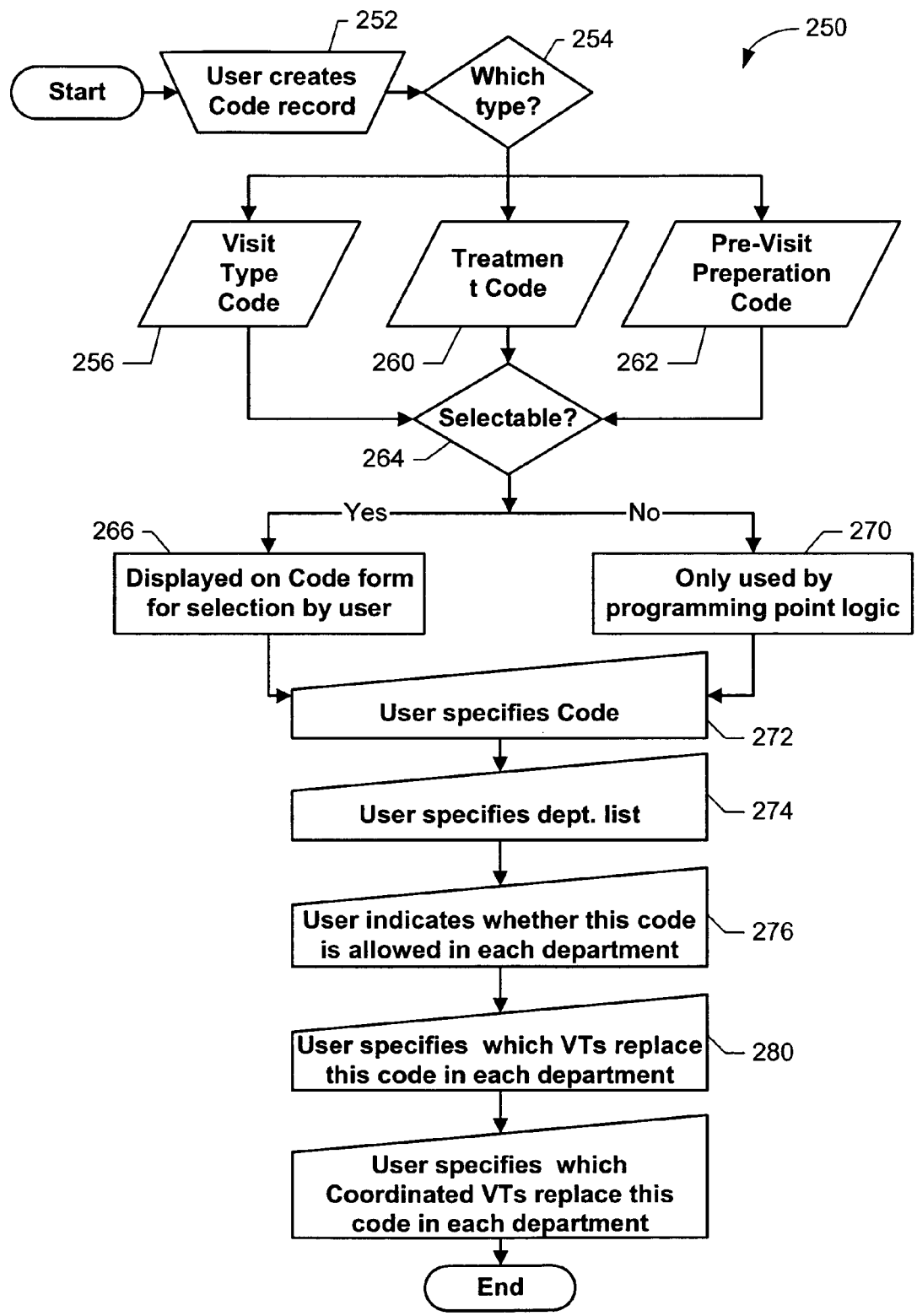
FIG. 6 is an exemplary flowchart illustrating some actions and decisions used in the creation of a Scheduling Codes form.

FIG. 6 is an exemplary flowchart 250 depicting some of the actions and decisions used in the creation of a Scheduling Codes form, which may be one of the types of decision support available. In the flowchart 250, the HCO makes decisions about how to configure its HCIS. If the HCO takes advantage of the scheduling codes type of decision support, it then defines the code records available to the scheduler when prompting for the secondary input.

At a block 252, the person configuring the system creates a Code record. At a block 254 he might decide what type of code it is. There are no standard code types defined in the exemplary system disclosed in FIG. 6, to provide maximum flexibility to the HCO in configuring its HCIS. The examples shown include Visit Type codes (block 256), Treatment codes (block 260), and Pre-visit Preparation codes (block 262). These examples might greatly aid in visit type selection in an environment such as a cancer treatment center where a facility wants to make certain treatment and treatment preparation codes available to schedulers at the time of secondary input in order to give the system enough information to find an appropriate visit type code which contains the list of visit types used to replace the initial input of the scheduler.

At a block 264, the person configuring the system might specify whether the code is available for selection by the scheduler at the time of secondary input. If it is selectable, the code will appear on the form displayed in the user interface, as shown at a block 266. If it is not selectable, the scheduler will not be able to select it at the time of secondary input, and it may be used behind the scenes by the custom logic used to replace the initial visit type input. This is illustrated at a block 270. In the above example code types, the Treatment and Pre-Visit Preparation codes may be configured as selectable while the Visit Type codes may be non-selectable and only used in the custom logic.

At a block 272, the person configuring the system might give the Code record a code value. This value might be a free text response of any alphanumeric string used to mark up the code in any desired way. The code might then be used by the custom logic in the programming point in replacing the initial visit type input. For example, in the above code type examples, the selectable Treatment and Pre-Visit Preparation codes might have time lengths associated with them which are entered as the code value in each record. The custom logic might then use the code value lengths of each code record selected by the scheduler to determine the appropriate visit type code record by summing them and rounding them to the closest code value as specified in a Visit Type code record.

At a block 274, the person configuring the code record might specify a list of departments. At a block 276, he might indicate for each department specified at the block 274 whether this code is allowed in that department. At a block 280, he might specify which visit types in the system will be used to replace the scheduler's initial input in that department. This way, all departments in a location, which are often organized around specialties, may replace the same "dummy" initial visit type with a new visit type of their own particular needs. In addition, the person configuring the code record might create a parallel list of replacement visit types, or "coordinated" visits. This way, if a scheduler indicates that a visit should be "coordinated" then the system uses an alternate list of replacement visit types for the "dummy" visit type initially entered.

Figure 7:
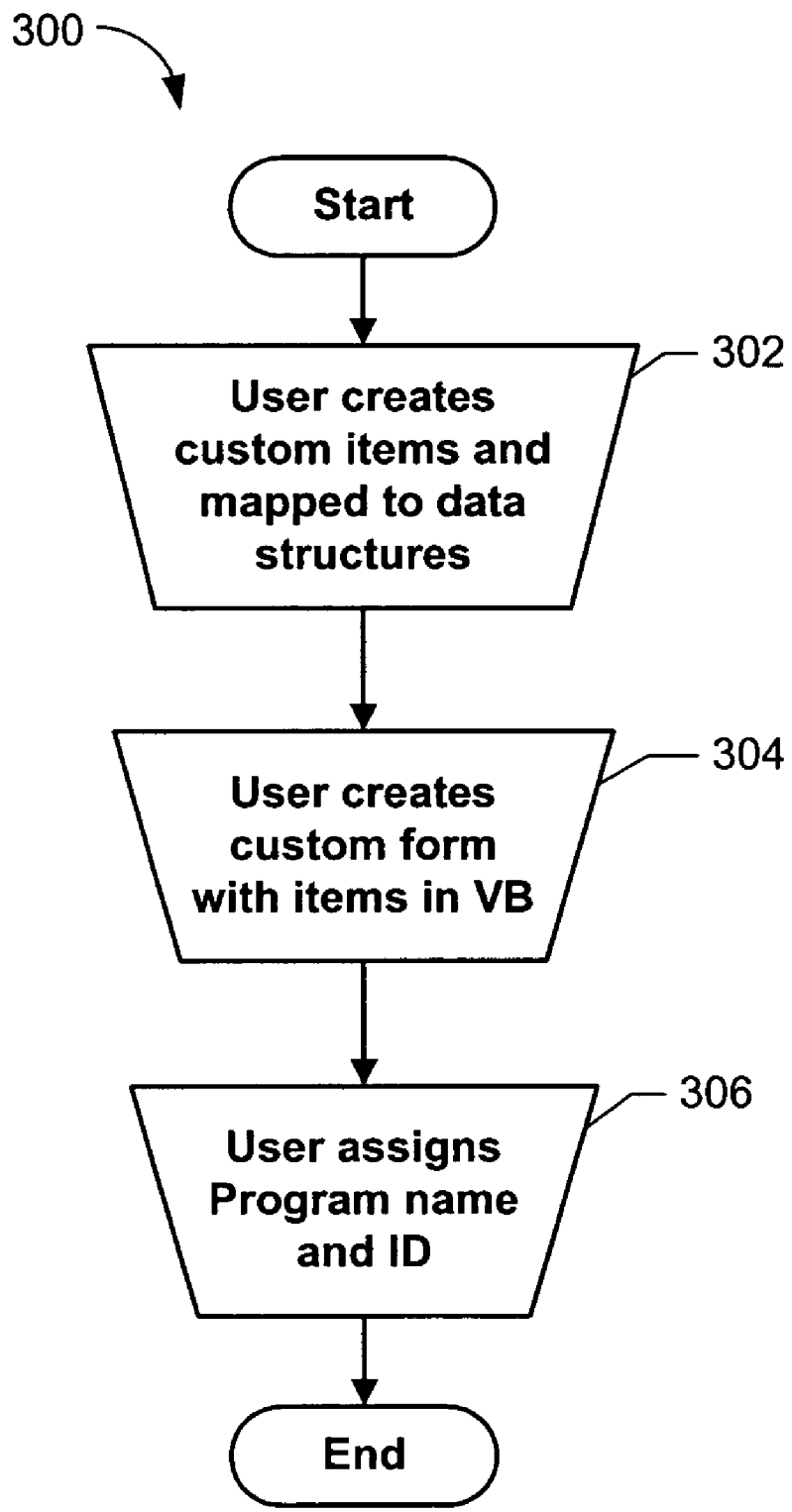
FIG. 7 is an exemplary flowchart illustrating some actions and decisions used in the creation of a custom form.

FIG. 7 is an exemplary flowchart 300 depicting some of the actions and decisions used in the creation of a custom form, which may be one of the available types of decision support. In the flowchart 300, the HCO makes decisions about how to configure its HCIS. If the HCO would take advantage of the custom form type of decision support, it might create the items and user controls displayed to the scheduler when prompting for the secondary input.

At a block 302, the person configuring the system might create items to capture data not included as part of a basic HCIS. These captured items might be mapped to data structures in a way similar to that illustrated in FIG. 8.

Whether custom items or standard HCIS items are being used, the HCO might still elect to create a custom form which might be programmed in an object oriented programming language such as Visual Basic, as illustrated at a block 304. After which the user assigns the form a program ID and name to be used as a reference by the HCIS (block 306).

Figure 8:
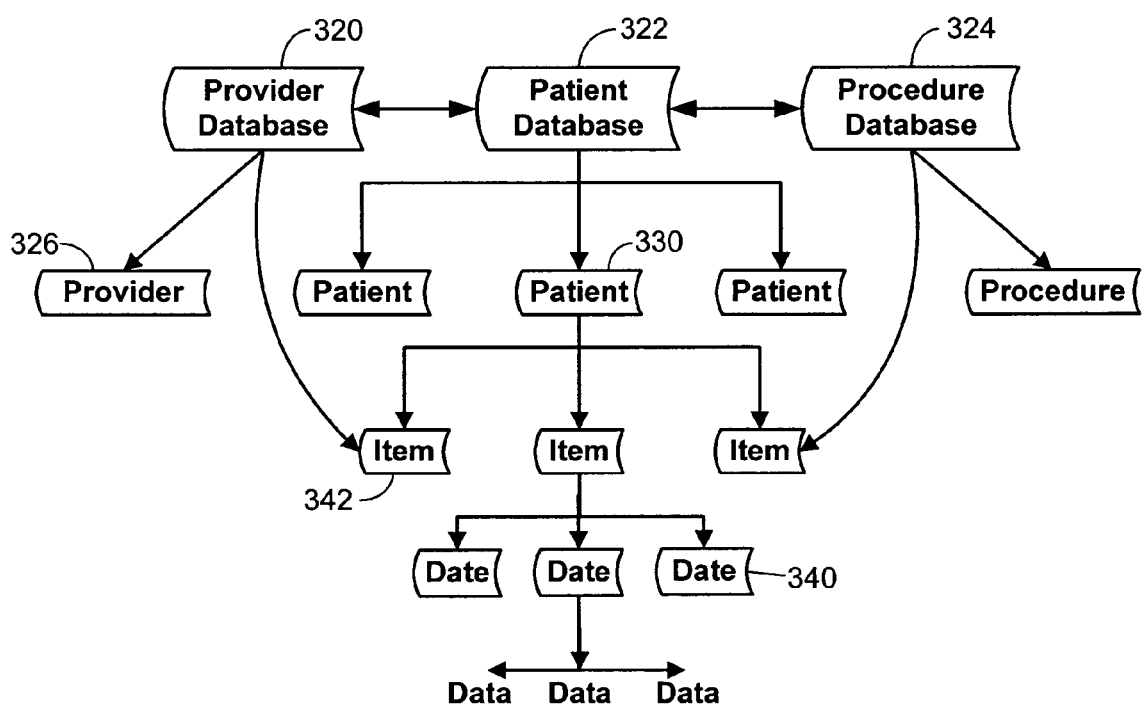
FIG. 8 illustrates one way data may be structured within a Patient Health Record.

FIG. 8 is a graphic representation of one exemplary way data might be structured within the Patient Health Record (PHR), which is housed in the HCIS. In FIG. 8, there are, essentially, 5 levels at which to access information on the data tree.

Level 1 is the database level. This level represents a collection of like entities within which records can be created and about which data can be collected. For example, FIG. 8 depicts three such databases: Provider database 320, Patient database 322, and Procedure database 324. However, it is to be understood that there could be any number of databases, depending on the implementation of the HCIS.

Level 2 is the record level. This level represents an individual entity within a given database. For example, within the Provider database 320, a record represents an individual physician, nurse, assistant, etc. 326. Within the Patient database 322, a record corresponds to a Patient 330. And within the Procedure database 324, a record corresponds to an individual procedure performed on the patient during his visit.

Level 3 is the item level. This level represents an individual piece of information which is collected for a given record. For example, within a Provider's record, you might want to record his specialty. Within a Patient's record, you might want to record his primary care provider. Within a Procedure record, you might want to record its billing status.

Level 4 is the contact level. This level represents the individual date 340 on which a value is recorded for an item. For example, within a patient's record, you might record the blood pressure every time he comes in to see his physician, and each time, you would record the reading in the same item.

Level 5 is the data item level. This level represents multiple values for a given item, recorded on a given date. For example, in a patient's record you might record all the insurance coverages he currently has whenever he visits his physician.

The embodiment shown in FIG. 8 allows for links between the databases 320, 322, and 324 at the Item level. For example, if you want to record which providers treated a patient when he came in, you might utilize the link between the Provider database 320 and the Treatment Team item 342 in the patient's record. If you wanted to record which procedures a patient was seen for, you might utilize a similar link with the Procedures database 324. This linking ensures cohesion between databases and correct, timely data.

The branching structure of the data allows for any number of different subsets or combinations of data upon retrieval, depending on the parameters specified. For example, you might access a patient record and return all the branches beneath it, thereby providing a complete history of a patient's record within the PHR. Or, by specifying the appropriate Item and Date, you might return the primary care provider for every patient on a certain date. Or, you might simply return a single item for a single patient record on a certain date.

Figure 9:
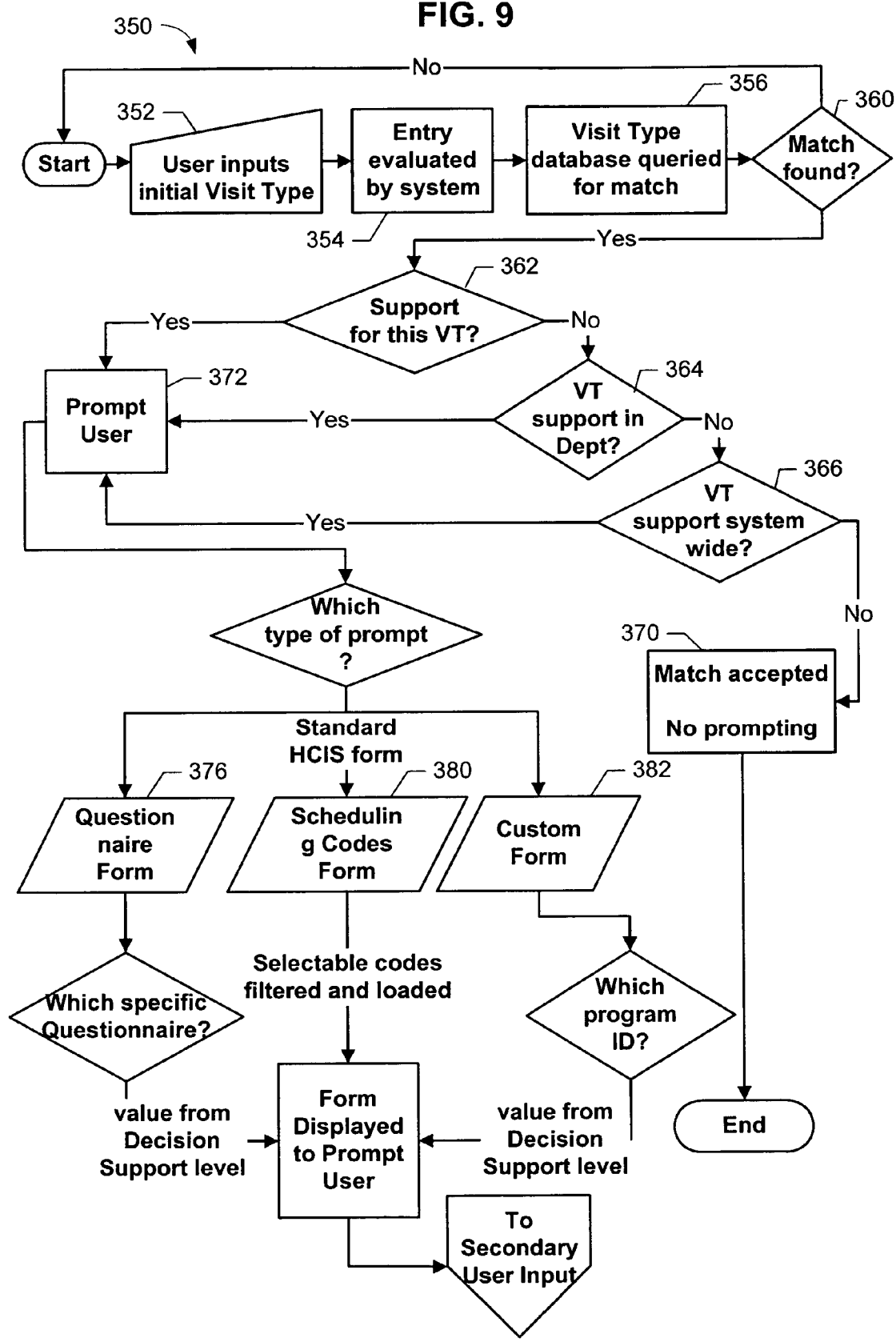
FIG. 9 is an exemplary flowchart of some of the actions that may be taken by an HCIS and some decisions made by a scheduler during validation of an initial visit type.

FIG. 9 is an exemplary flowchart representation 350 of some of the actions that may be taken by the HCIS and the decisions made by the scheduler during validation of the initial visit type input and subsequent determination of decision support prompting.

At a block 352, the scheduler would input an initial visit type. This might be any normally scheduled visit type or it might be a visit type set up as a "dummy" visit type which is used to trigger the decision support protocols.

At a block 354, initial input entered by the scheduler is evaluated by the HCIS as a valid entry and the database of visit types is queried for a match at a block 356. If no match is found, the scheduler is notified and may then make another entry. If a matching visit type is found, the HCIS evaluates that visit type record at a block 362 to determine whether decision support has been enabled for it. If not, the HCIS evaluates the login department of the scheduler at a block 364 to determine whether decision support has been enabled for users in that department. If not, the HCIS evaluates the facility record at a block 366 to determine whether decision support has been enabled system wide. If no decision support has been enabled, at any of these levels, the match is accepted at a block 370, no prompting is triggered and the scheduler is allowed to continue making the appointment with the initial input.

If decision support has been enabled, the scheduler will be prompted by the HCIS at a block 372 for further input. Which kind of prompting is displayed to the scheduler is dependant upon which level decision support has been enabled at and which kind of support has been specified there. In the embodiment 350, this would include questionnaire forms 376, scheduling codes forms 380, or custom defined forms 382.

If the type of prompt to be displayed is a questionnaire, the HCIS supplies the questionnaire record specified at the level at which decision support was triggered and displays it on a form to the scheduler in the user interface.

If the type of prompt to be displayed is Scheduling Codes, the system uses a standard HCIS form for display to the scheduler. Before the form is displayed, the records in the scheduling codes database are evaluated to determine whether they are allowed in the current department and any that are not allowed might be filtered out.

If the type of prompt to be displayed is a custom form, the HCIS supplies the program ID of the form from the same level at which decision support was triggered and displays the form to the scheduler in the user interface.

FIG. 10 is an example of some pseudo code representing code a HCO might write into the programming point logic to be applied when the scheduler has supplied the secondary input on the decision support form.

The logic represented in the sample might be used to evaluate the code records selected by a scheduler on the scheduling codes form (for example the selectable Treatment type codes) and sum the lengths in each one in order to determine which non-selectable Visit Type code record to use. The Visit Type code record might then be used to supply the appropriate visit types to the programming point, which sends them back to the user interface to replace the initial "dummy" visit type entered by the user.

It is to be understood that any conceivable logic might be used to instruct the HCIS on how and on which parameters to use to recommend or replace or restrict scheduling. In addition, it is to be understood that any logic used for evaluating custom items or question records and/or their stored responses might perform the same or similar functions to that implemented for code records, while also having their own particular requirements and implementations.

Figure 11:
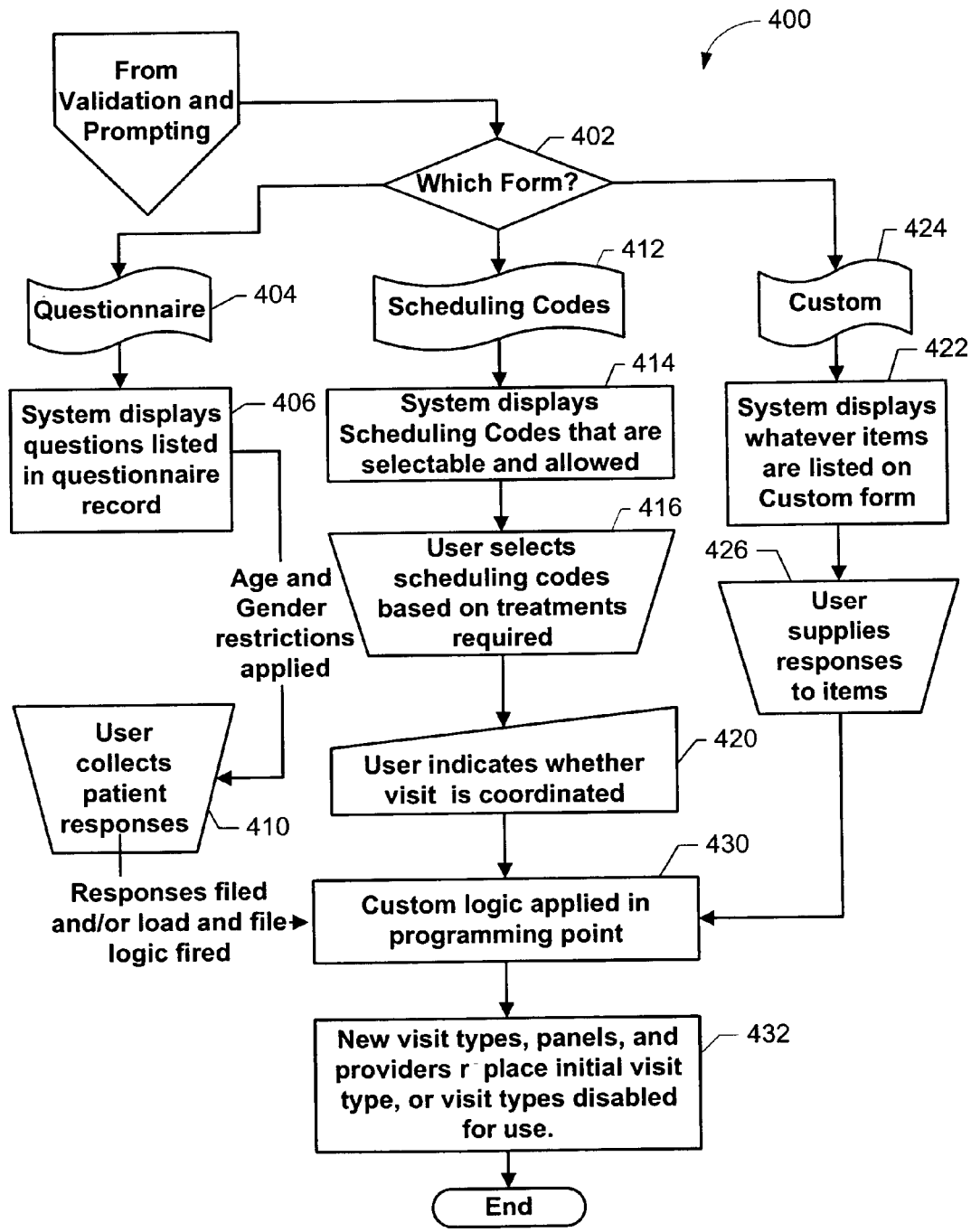
FIG. 11 is an exemplary flowchart of some of the actions that may be taken by an HCIS and some decisions made by a scheduler during secondary user input and subsequent application of custom logic.

FIG. 11 is an exemplary flowchart representation 400 of some actions taken by the HCIS and the decisions made by the scheduler during secondary user input and subsequent application of custom logic as specified in FIG. 10.

At a block 402, a form is displayed to the scheduler prompting him for further information. If the form being displayed is a questionnaire 404, the HCIS loads the questionnaire record which contains pointers to the question records built by the HCO and displays them on the form at a block 406, disabling or filtering questions based on any age and/or gender restrictions from the question records as applied to the patient currently selected. At a block 410, the scheduler collects the responses from the patient on the form.

If the form being displayed is a scheduling codes form 412, the system has filtered the codes available to the scheduler based on whether they are allowed in the current department, as shown at a block 414. At a block 416, the scheduler might then select the appropriate codes for the current visit based on the treatments required, and at a block 420, he might indicate whether the visit is a coordinated visit, thereby alerting the HCIS as to which list of replacement visit types to use.

At a block 422, the HCIS might display whatever items are specified for the custom form 424. At a block 426, the scheduler supplies responses to those items.

At a block 430, when the scheduler has elected to file the responses to the decision support prompting, any custom logic specified in a programming point will be applied to the responses. As shown at a block 432, depending on what logic is written into the programming point, the HCIS might lock down scheduling of certain visit types, replace certain visit types, recommend visit types, recommend panels of visit types, recommend providers, recommend pools of providers or resources, select pools of providers or resources, initiate medical necessity checking, etc.

Although the technique for providing healthcare organizations the ability to allow for the quick and easy scheduling of basic appointments while also presenting the scheduler with robust decision support tools for more complex visit types and consequently replacing the user's initial visit type choice with a more appropriate system generated choice described herein, is preferably implemented in software, it may be implemented in hardware, firmware, etc., and may be implemented by any other processor associated with a healthcare enterprise. Thus, the routine(s) described herein may be implemented in a standard multi-purpose CPU or on specifically designed hardware or firmware as desired. When implemented in software, the software routine(s) may be stored in any computer readable memory such as on a magnetic disk, a laser disk, or other machine accessible storage medium, in a RAM or ROM of a computer or processor, etc. Likewise, the software may be delivered to a user or process control system via any known or desired delivery method including, for example, on a computer readable disk or other transportable computer storage mechanism or over a communication channel such as a telephone line, the Internet, etc. (which are viewed as being the same as or interchangeable with providing such software via transportable storage medium).

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The invention claimed is:

1. A computer-implemented method of providing a healthcare provider the ability to schedule an appointment, comprising:
   receiving an electronic request to schedule an appointment for a patient, the request including an initial type of visit;
   electronically accessing a stored listing of types of visits to determine whether the initial type of visit has been designated as requiring the use of a decision support tool for scheduling that type of visit;
   implementing the at least one computer-implemented decision support tool based on the determination that the initial type of visit is associated with a decision support tool, the decision support tool configured to implement the steps of:
      identifying additional input needed to schedule the appointment that is particular to the initial type of visit,
      filtering the additional input based on a stored patient medical record,
      requesting the filtered additional information from the appointment scheduler,
      receiving the additional input from the appointment scheduler, and
      generating at least one system generated type of visit different from the initial type of visit to replace the initial type of visit based on the additional input and based on the type of visit; and
   scheduling the appointment for the patient using the system generated type of visit in lieu of scheduling an appointment using the initial type of visit.

2. The method of claim 1, wherein determining and implementing a modification includes supplementing the initial type of visit with a system generated type of visit.

3. The method of claim 1, wherein providing the appointment scheduler with a request to provide additional input includes providing an appropriate form for use by the appointment scheduler to assist in obtaining a set of information corresponding to the requested appointment.

4. The method of claim 3, wherein the appropriate form is one of the following forms: a questionnaire form, a scheduling codes form, or a custom form.

5. The method of claim 3, wherein requesting the additional information includes displaying the appropriate form to the appointment scheduler.

6. The method of claim 1, further comprising obtaining an additional set of information from the patient.

7. The method of claim 6, wherein obtaining the additional set of information comprises obtaining a plurality of responses to a corresponding plurality of questions, the plurality of questions being listed on a questionnaire form.

8. The method of claim 6, wherein obtaining the additional set of information comprises receiving a scheduling code based on a treatment required for the patient, the scheduling code being listed on a scheduling codes form displayed to the appointment scheduler.

9. The method of claim 8, comprising determining which scheduling code to list on the scheduling codes form, the scheduling code being one of the following types of scheduling codes: a visit code, a treatment code, or a pre-visit preparation code.

10. A computer-implemented method of providing decision support to an appointment scheduler in a healthcare setting, comprising:
receiving an electronic request to schedule an appointment for a patient, the request including an initial type of visit;
electronically accessing a stored listing of types of visits to determine whether the initial type of visit has been designated as requiring the use of a decision support tool for scheduling that type of visit in the received request;
implementing at least one computer-implemented decision support tool based on the determination that the initial type of visit is associated with a decision support tool, the decision support tool configured to implement the steps of:
identifying additional input needed to schedule the appointment that is particular to the initial type of visit,
accessing a stored patient medical record to determine the additional information,
identifying missing information particular to the initial type of visit that cannot be provided by the electronic request and the stored patient medical record,
requesting the missing information from the appointment scheduler,
receiving the missing information from the appointment scheduler,
determining a system generated type of visit that is different from the initial type of visit, the system generated type of visit including a healthcare provider identification and a healthcare department identification;
replacing the initial type of visit based on the additional input with the system generated type of visit different from the initial type of visit; and
scheduling the appointment for the patient using the system generated type of visit in lieu of scheduling an appointment using the initial type of visit.

11. The method according to claim 10, wherein determining and implementing a modification includes supplementing the initial type of visit with a system generated type of visit.

12. The method of claim 10, wherein requesting the additional information includes providing an appropriate form, wherein the appropriate form is one of the following forms: a questionnaire form, a scheduling codes form, or a custom form.

13. The method of claim 10, wherein requesting the additional information includes obtaining a plurality of responses to a corresponding plurality of questions, the plurality of questions being listed on a questionnaire form.

14. The method of claim 10, wherein requesting the additional information includes receiving a scheduling code based on a treatment required for the patient, the scheduling code being listed on a scheduling codes form displayed to the appointment scheduler.

15. The method of claim 14, further including determining which scheduling code to list on the scheduling codes form, the scheduling code being one of the following types of scheduling codes: a visit code, a treatment code, or a pre-visit preparation code.

16. A computer-implemented system for providing decision support to an appointment scheduler in a healthcare setting comprising:
means for identifying the appointment scheduler;
means for electronically receiving an initial requested appointment for a patient, the requested appointment including an initial type of visit;
means for accessing a listing of types of visits stored in a computer database to determine whether the initial type of visit is associated with a decision support tool and identifying at least one decision support tool for the initial type of visit associated with a decision support tool;
means for determining an appropriate form to provide the appointment scheduler to assist in obtaining an additional set of information describing the patient and corresponding to the requested appointment;
means for displaying the appropriate form to the appointment scheduler;
means for receiving the additional set of information from the patient; and
means for implementing the decision support tool to replace the initial type of visit in the requested appointment with a system generated type of visit having a type of visit different from the initial type of visit based on the type of visit and output from the decision support tool based on the additional set of information from the patient prior to scheduling the requested appointment;
means for scheduling the requested appointment using the system generated type of visit in lieu of scheduling an appointment using the initial type of visit.

17. The system of claim 16, wherein the means for identifying the appointment scheduler comprises means for retrieving data from a memory corresponding to the appointment scheduler.

18. The system of claim 16, wherein determining and implementing a modification includes supplementing the initial type of visit with a system generated type of visit.

19. The system of claim 16, wherein the appropriate form is one of the following forms: a questionnaire form, a scheduling codes form, or a custom form.

20. The system of claim 16, wherein the means for obtaining the additional set of information comprises means for obtaining a plurality of responses to a corresponding plurality of questions, the plurality of questions being listed on a questionnaire form.

21. The system of claim 16, wherein the means for obtaining the additional set of information comprises means for receiving a scheduling code based on a treatment required for the patient, the scheduling code being listed on a scheduling codes form displayed to the appointment scheduler.

22. The system of claim 16, further including means for determining which scheduling code to list on the scheduling codes form, the scheduling code being one of the following types of scheduling codes: a visit code, a treatment code, or a pre-visit preparation code.

* * * * *